Patented Sept. 4, 1945

2,384,141

UNITED STATES PATENT OFFICE 2,384,141

COMPOSITIONS CONTAINING RESINOUS POLYMERS OF CYCLOPENTADIENE

Frank J. Soday, Swarthmore, Pa., assignor to The United Gas Improvement Company, a corporation of Pennsylvania No Drawing. Application March 26, 1941,
Serial No. 385,337

14 Claims. (Cl. 260—32)

This invention pertains generally to the production of technically valuable products from the polymers obtained from unsaturated hydrocarbons.

More particularly, the invention pertains to the production of valuable products from the polymers obtained by the catalytic polymerization of cyclopentadiene, substituted cyclopentadienes, or mixtures thereof.

A principal object of the invention is the provision of a resinous polymer from cyclopentadiene possessing improved resistance to deterioration with age.

Still another object of the invention is to furnish a product of the type described which will be characterized by resistance to the development of brittleness and increasing color with age.

A further object of the present invention is to provide an organic coating or impregnating resinous material from catalytically polymerized cyclopentadiene, said coating or impregnating material containing a stabilizing agent, or agents, which serves to retard or prevent the development of brittleness and increasing color of the said resinous material with age.

Another object is the provision of a coating composition from catalytically polymerized cyclopentadiene containing a stabilizing agent and other additives such as wax-like materials and/or sulfur containing materials.

Other objects of the invention will be apparent to one skilled in the art from a consideration of the specification and claims.

Generally speaking, the catalytically polymerized cyclopentadiene employed in the present invention is characterized by being soluble in benzene, toluene, chloroform, carbon tetrachloride, and high flash naphtha, and insoluble in alcohol, acetone, ether, and water. For the purpose of convenience in the specification and claims, these solubility characteristics will be defined by the term "benzene soluble," although it is to be understood that the actual presence of benzene in the resinous solution is not implied thereby.

Methods for preparing the benzene-soluble catalytically polymerized cyclopentadiene employed in my invention are described and claimed in my copending application, Serial Number 204,786, filed April 28, 1938; in the copending application, Serial Number 194,523, filed March 8, 1938, by Samuel G. Trepp; and in the copending application, Serial Number 290,931, filed August 19, 1939, by Samuel G. Trepp.

The resinous polymer obtained by the catalytic polymerization of cyclopentadiene possesses unusual adhesive, cohesive, and elastic properties. It is compatible with a number of other resinous materials, gums, rubber, and the like, and may be used for the preparation of various plastic masses or mixtures which find varied applications in the art. Among these may be mentioned the preparation of various adhesives and cements.

Among its important applications is the preparation of liquid coating compositions, which may be used to coat practically all known surfaces, such as those of metals, wood, fiber board, mineral fiber sheets, glass, cement, stone, and the like. A particularly important field of application is its use as a coating for sanitary containers, as more fully described in the copending application, Serial Number 291,007, filed August 19, 1939, by Newcomb K. Chaney.

The coating properties of catalytically polymerized cyclopentadiene may be enhanced, for certain application, by the incorporation of sulfur-containing materials in the coating composition prior to complete conversion of the coating film, as more completely set forth in the copending application, Serial Number 370,138, filed December 14, 1940, by Newcomb K. Chaney.

In addition, the addition of certain waxes, either alone or in conjunction with sulfur containing materials, to catalytically polymerized cyclopentadiene still further improves its coating properties for certain specific applications, such as coating blanks for cap stamping operations, as more fully described in the copending application, Serial Number 371,988, filed December 27, 1940, by Alger L. Ward.

As previously pointed out, catalytically polymerized cyclopentadiene is soluble in a number of solvents, particularly those of the aromatic type. However, upon applying a solution of catalytically polymerized cyclopentadiene to a given surface, and permitting the solvent to evaporate in the presence of air, the polymer becomes insoluble in all known solvents within a very short period of time. As this decrease in solubility is accompanied by an increase in weight, it is evident that this change in the fundamental structure and properties of the polymer is caused by the absorption of some element, or material, from the atmosphere. Exhaustive tests have definitely proven that this substance is oxygen.

This change can be accelerated greatly by the application of heat. Thus, the application of a solution of catalytically polymerized cyclopentadiene to a given surface, such as a steel panel, followed by baking at any desired temperature for a short period of time, such as exposing the coated panel to a temperature of 120° C. for a period of 20 minutes in the presence of air, results in the almost complete conversion of the polymer to the insoluble, infusible form. A quantitative examination of this phenomenon also shows that the polymer which has been treated in this manner has increased in weight due to the absorption of oxygen from the atmosphere.

Catalytically polymerized cyclopentadiene is a highly unsaturated type of resinous polymer, possessing approximately one double bond for each cyclopentadiene unit present in the resin molecule. It is assumed that the conversion of the soluble type of polymer to the insoluble type of polymer, either at room temperature or at elevated temperatures, may be initiated by the absorption of traces of oxygen from the atmosphere. These oxidation centers presumably then accelerate the further polymerization of the cyclopentadiene resin molecules to form a cross linked three-dimensional type of polymer. As this type of resinous polymer is insoluble in the ordinary solvents, the progressive conversion of the linear type of cyclopentadiene resin to the three-dimensional type of polymer is accompanied by a corresponding reduction in the solubility characteristics of the coating system. The final result is an infusible, insoluble coating, in which it may be assumed that practically all of the resinous polymers present have been united by means of an intricate system of cross-linkages to form a single, continuous film. Due to the fact that oxygen has been absorbed during this process, certain oxygen bridges between adjacent molecules undoubtedly are present also.

However, the conversion of the soluble type of catalytically polymerized cyclopentadiene to the infusible, insoluble type also can be carried out in the substantial absence of oxygen, indicating that the initial formation of oxygenated centers may not be an essential factor in initiating the reaction, or reactions, leading to the formation of the three-dimensional cross-linked infusible type of polymer. Thus, a solution of catalytically polymerized cyclopentadiene may be applied to the surface of a metal, or other, panel in an inert atmosphere, followed by baking at an elevated temperature for a suitable period of time, say at a temperature of 130° C. for a period of 25 minutes, in an inert atmosphere. The resin is largely, or completely converted to the insoluble, infusible form by this treatment.

In a similar manner, a solution of catalytically polymerized cyclopentadiene may be applied to the surface of a similar metallic, or other, panel in an inert atmosphere, after which a stream of inert gas is passed through the container at room temperature in order to remove the solvent volatilized from the surface of the coating. The soluble polymer ultimately is converted to the insoluble, infusible form by this treatment, although a somewhat longer period of time usually is required than in the case of corresponding coating films which have been dried in the presence of air.

It should be pointed out, however, that in each of the last two cases discussed, the presence of minute traces of oxygen in the resin solution used, or in the inert gas, may be sufficient to initiate the reactions leading to the formation of the insoluble, infusible form of the resin. If so, the conversion in all cases could be assumed to be caused by the initial absorption of small quantities of oxygen which, in turn, set up oxygenated centers, or other unstable or reactive zones. Subsequently, these centers of activation serve as catalysts to hasten the conversion of the soluble form of the resin to the insoluble, three dimensional form. However, I have been unable to demonstrate the truth of this hypothesis in all cases, as the increase in weight, if any, of the coatings which have been converted to the insoluble state in an inert atmosphere have been insufficient to demonstrate that any significant portion of oxygen has been absorbed during this process.

Regardless of the theories which may be used to explain the conversion of soluble catalytically polymerized cyclopentadiene to the insoluble, infusible form, the coating film obtained as the result of such conversion possesses outstanding cohesive, adhesive, and elastic properties. Smooth, glassy, colorless, highly flexible and extensible, and tenaciously adhering films insoluble in almost all solvents are obtained readily on practically all surfaces by the application of a solution of catalytically polymerized cyclopentadiene to such surfaces, followed by drying or baking steps in the presence or absence of oxygen, and at room temperature or at elevated temperatures.

Further exposure to the atmosphere of such insoluble resinous films, however, results in a gradual increase in the weight of the films, as well as a progressive darkening in color. As the result of a large number of experiments, it has been found that this is due to the absorption of oxygen from the atmosphere.

As the properties of the converted cyclopentadiene resin film are such as to make it especially well adapted to the coating of metal objects which are to be subsequently shaped, formed, pressed, stamped or otherwise subjected to mechanical stresses, the importance of the adhesive, cohesive, and elastic properties of the coating film cannot be over-emphasized. Such coated blanks are commonly prepared in the trade at suitable intervals and stored until they can be punched, formed, or otherwise treated.

I have found that the absorption of a moderate quantity of oxygen, such as that normally absorbed during the conversion of the soluble cyclopentadiene resin to the insoluble form, and that absorbed during the exposure of the coating film to the atmosphere for a short period of time, does not harm the color or coating properties of the film to any measurable extent. In fact, the oxygen absorbed during this period may be beneficial.

Upon prolonged exposure to the atmosphere, however, much larger quantities of oxygen are absorbed, and the coating properties and color of the coating film are somewhat impaired.

In accordance with my invention the commercial utilization of catalytically polymerized cyclopentadiene for coating or other purposes is enhanced by a treatment which permits the formation of the insoluble form of polymer after application but which materially reduces any subsequent impairment of the polymer as evidenced by a loss in its adhesive, cohesive or elastic properties or by an increase in the color of the polymer with age.

As the result of extensive experimentation, I have found that the addition of small quantities of certain secondary amines to catalytically polymerized cyclopentadiene retards the embrittlement and increase in color of this material for relatively long periods of time.

Examples of these secondary amines may be represented by the following general formula

in which R₁ is a substituted or unsubstituted aryl, such as aralykyl; cycloparaffinic, cycloolefinic, hydroaromatic, or naphthenic ring or group, and in which R is a substituted or an unsubstituted aryl, such as aryl-alkyl; alkyl-aryl, alkyl, cycloparaffinic, cycloolefinic, hydroaromatic, or naphthenic ring or group. Included are secondary amines such as for example

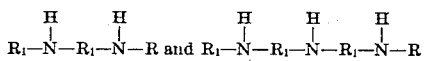

where R and R₁ have the same meaning as before.

Secondary amines containing one or more substituted or unsubstituted aryl groups are preferred.

Examples of secondary amines which are particularly satisfactory when used as stabilizing agents for catalytically polymerized cyclopentadiene are Diphenyl-p-phenylene diamine

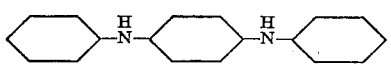

Phenyl beta naphthylamine,

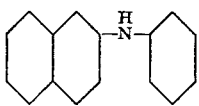

4,4'-di-isopropoxydiphenylamine,

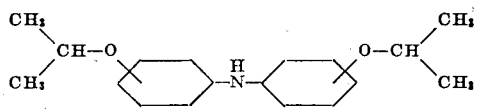

Aldol alpha naphthylamine (and polymers thereof)

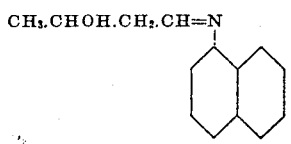

Symmetrical di beta naphthyl-para-phenylenediamine,

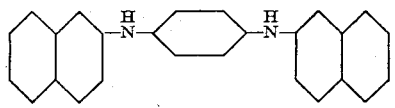

Trimethyl dihydroquinoline (and polymers thereof),

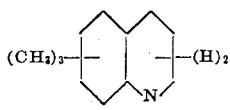

and the ditolylamines

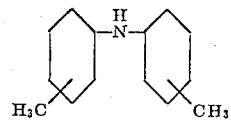

Mixtures of certain of these secondary amines also are excellent inhibiting agents for this purpose. Included among the mixtures which have been found particularly desirable are the commercial products known as "Age-Rite Exel," which is a mixture of isopropoxydiphenylamine and diphenyl-p-phenylene diamine, "Age-Rite-Hipar," which is a mixture of phenyl beta naphthylamine, isopropoxydiphenylamine, and diphenyl-p-phenylene diamine, and "Age-Rite HP," which is a mixture of phenyl beta napthylamine and diphenyl-p-phenylene diamine.

Although any desired quantity of the secondary amines of the character described may be added to catalytically polymerized cyclopentadiene solutions, I have found that the addition of from 0.1 to 10.0% by weight, based on the quantity of polymer present, is sufficient to stabilize the polymer for a satisfactory period of time. From 0.5% to 5.0% will be found to be satisfactory for most purposes.

The stabilizing action of secondary amines of the character described on polycyclopentadiene is not shared by all substances known as inhibitors or antioxidants, very many of which have no stabilizing action on polycyclopentadiene. The action of secondary amines of the character described on polycyclopentadiene is singular and unique.

In general, the resistance to darkening and embrittlement of the polycyclopentadiene increases with increasing quantity of the stabilizing agent, or agents, employed.

Certain of my stabilizing agents are not soluble in all proportions in the solvent normally employed in the preparation of polycyclopentadiene solutions. Consequently, upon the addition of relatively large quantities of one or more of these stabilizing agents to such solutions, and permitting the solution to stand for an appreciable period of time, a portion of the stabilizing agent will be found to have precipitated out of the solution. However, upon gently agitating or shaking polycyclopentadiene solutions containing quantities of precipitated stabilizing agent, a suspension of the stabilizing agent is formed, and the solution containing the suspended stabilizing agent may be applied to the surface to be coated, or used in other ways, with very satisfactory results.

Catalytically polymerized cyclopentadiene stabilized by the presence of one or more secondary amines of the character described is ideally suited to the coating of sheet metal which is to be fabricated into objects by stamping, bending, drawing, threading, turning, punching, and the like.

Machine operations, such as the foregoing, are particularly severe upon coatings or films adhering to the sheet metal, and, with many coating compositions of the prior art, it is extremely difficult to obtain a formed object with a coating or film system adequate for the environment to which the finished article is to be subjected when in use.

To illustrate, many types of films and particularly those made from many other resinous materials, crack, check, striate, silk and/or peel when subjected to the foregoing mechanical operations.

Because of the great economical advantages of coating the sheet metal prior to the various forming operations, the importance of a film or film system which will withstand the various forming operations without injury cannot be overestimated.

Another quality of extreme importance, particularly in the case of certain uses to which the finished articles are to be put, is the relative insolubility and chemical inertness of the film or film system.

An outstanding example of such a use is in the food packaging field in which metal cans and metal foil wrappings are extensively used.

The term food is employed herein to mean that which is eaten or drunk or absorbed for nourishment or otherwise, and includes not only beverages such as beer, but also substances from which food is prepared, examples of which are coffee beans, whether ground or not, and tea leaves.

In the case of cans, for example, economical considerations make it extremely advantageous to apply the film or film system to the sheet metal while in the flat. The can parts are then cut, shaped and joined all in a manner well known in the art. Severe stresses are set up during the forming operations, particularly in the case of the die-drawing of the can ends. The can ends and portions of the can body are again subjected to severe stresses by the seaming chuck, seaming rolls, and cooperating parts of the can closing machine during the well known double-seaming can sealing operation.

For instance, the die-drawing step produces in the can ends not only angles of very nearly 90° with relatively sharp bends, but also a peripheral portion which is curled back upon itself.

A film or film system to be successful must withstand such metal working operations without peeling, rupturing, or otherwise failing in the slightest degree.

Metal caps are used in large quantity, not only on glass bottles but also on certain types of metal containers, such as those for holding beverages.

In many cases, such caps are provided with threads for engaging cooperating threads upon the bottle or other container.

The operation for forming the threads in the metal caps is extremely severe.

In the food packaging field it is, of course, absolutely essential that the film or film system be completely insoluble and chemically inert, as well as completely incapable of imparting taste or odor to the food product.

In this connection, it is a well known fact that the ordinary tin lining is unsatisfactory in the case of certain foods of which grape juice, orange juice, and beer are outstanding examples.

Some foods develop hydrogen sulfide upon standing which, in turn, reacts chemically with the tin lining to form tin sulfide. In case any of the iron is exposed, such as through cracks, black iron sulfide is formed.

Furthermore, in the food packaging field, the packaged food stuff, after the can has been sealed, is, in many cases, subjected to a sterilization treatment by the application of heat. Such treatment, by reasons of the increased temperatures involved, greatly accelerates any reactions capable of taking place.

Numerous attempts have been made to find a lacquer which might be applied over, or substituted for, the tin coating. Films made with previously known lacquers, as a rule, however, have failed to have sufficient adhesion, cohesion, or elasticity to resist forming operations, or they have failed to resist reaction with foods, or they have failed in that they have imparted taste or odor to the foods.

This led to the adoption of a procedure whereby a coating composition having good bonding properties was employed as a primer coat for a top coat having proper food-resisting and taste and odor characteristics, of which the material known commercially as "Vinylite" is an outstanding example. In turn, this presented the further problem of finding two such coating compositions which would bond properly with each other, as well as finding a primer coat which would not impart taste and odor to the food despite the top coat.

The product known commercially as "Vinylite" though deficient as a primer coat is, nevertheless, satisfactory as a top coat provided a proper bond that will withstand not only the forming operations but also the sterilization treatment can be formed between it and the primer coat.

In this connection, many films and dual film systems become cloudy during the sterilization step, such cloudiness being generally referred to as "blushing." The resulting discoloration is very undesirable from the standpoint of market appeal, since the average housewife looks with great disfavor upon any discoloration of the inside surface of a can when removing food therefrom.

It follows that any film or film system to be suitable must not only be capable of resisting "blushing," but must in itself have an acceptable appearance and preferably one suggesting utmost cleanliness.

Since films and film systems of the character under consideration are necessarily extremely thin, the primer coat is preferably one capable of direct contact with the food stuff without chemical reaction and without imparting taste or odor thereto. Certain substances which might otherwise be satisfactory as primer coats fail because they are capable of imparting taste and odor to food stuffs through the top coat.

In addition to the foregoing, there are certain metals which are extremely difficult to coat with satisfactorily adhering films or film systems of any character. Examples are zinc, zinc plate, magnesium and magnesium alloys, such as the material known commercially as "Dow metal." In fact, practically all previously known resinous coating compositions fail to form a satisfactory bond with these materials.

In accordance with my invention, single film systems and multiple film systems having all of the above desirable properties may be produced by forming (a) said single film system, or (b) the primer coat of a multiple film system provided the top coat is of a satisfactory character, or (c) the top coat of a multiple film system provided the primer coat is of a satisfactory character, with a liquid coating composition comprising catalytically polymerized cyclopentadiene containing a minor proportion of one or more secondary amines of the character described.

The addition of a substance or substances of a wax-like nature, or a sulfur-containing substance, or both, to the catalytically polymerized cyclopentadiene solution containing one or more secondary amines of the character described also will be found to improve the coating properties of the catalytically polymerized cyclopentadiene for certain applications, as will be more fully explained hereinafter. Drying of the applied film or films may be accomplished with or without the aid of heat.

The following are specific examples of the preparation of the desired polymer.

Example 1

Approximately 1500 parts of toluene were charged to a small, jacketed kettle provided with an agitator and a reflux condenser, after which 3 parts of boron trifluoride-diethyl ether complex was added to the kettle with good agitation. The kettle was heated to a temperature of 35–40° C., after which the external application of heat was discontinued.

A previously prepared mixture of 525 parts of cyclopentadiene and 500 parts of toluene was gradually added from a mixing vessel, which was maintained at a temperature sufficiently low to prevent the volatilization of the cyclopentadiene. The rate of addition was so regulated that the contents of the reaction kettle were maintained at a temperature between 25–30° C., while circulating a cooling medium through the jacket.

Approximately 60 minutes were required for the addition of the cyclopentadiene-toluene mixture, after which the reaction was continued for an additional period of 1½ hours at a temperature of 25–50° C.

Approximately 5 parts of water then were added to hydrolyze the catalyst, after which the mixture was agitated for a period of 30 minutes. A total of 75 parts of milk of lime ($Ca(OH)_2$) then was added, the temperature being maintained between 18 and 30° C. during this period.

After agitating for an additional period of one hour, 130 parts of filter aid, such as diatomaceous earth, were added. An additional quantity of filter aid, amounting to approximately 70 parts, was placed on a suction filter, and the product pumped through the filter.

The product was a 20% solution of the desired polymer.

In the above example, the particular temperatures chosen are more or less for expediency, but it will be noted that at no time did the temperature exceed 100° C. or even 80° C. Constant agitation and good cooling made it possible to prevent local overheating.

Example 2

A 0.30 cubic centimeter portion of aluminum chloride-diethyl ether complex was added to 60 grams of toluene with thorough agitation to form a suspension, emulsion or solution.

A mixture of 20 grams of cyclopentadiene and 20 grams of toluene was added to the suspension during the course of 12 minutes, the temperature ranging from 26–49° C. during the addition. The mixture then was agitated for an additional period of one hour, after which 1 cubic centimeter of water was added. This was followed by agitation for 15 minutes.

A 10 gram portion of quicklime (CaO) then was added to the reaction mixture, followed by agitation for an additional period of one hour.

A 5 gram portion of a suitable filter aid then was added, and the mixture filtered.

A filtered solution containing 16.4 grams of polycyclopentadiene was thus obtained.

Generally speaking, any other boron trifluoride-organic solvent complex or aluminum chloride-organic solvent complex might be substituted in the above examples. Other methods for making benzene-soluble catalytically polymerized cyclopentadiene such as by the use of catalytically active metallic halides in general, as well as any catalytically active solvent complexes of such metallic halides, or other complexes, or any mixture of such catalytically active agents, obviously may be employed. In addition, other catalysts may be employed for this purpose, examples of which are surface active agents, such as clay, diatomaceous earth, silica gel, alumina, activated carbon, and the like, mineral acids, mineral acid-organic solvent mixtures or reaction products, and the like.

Catalytically polymerized cyclopentadiene contains a maximum of one double bond for each cyclopentadiene unit present in the molecule. If we assume that the polycyclopentadiene molecule is linear in nature, then the number of double bonds present in the molecule is equal to the number of cyclopentadiene units present. On this basis, the quantity of oxygen which can be utilized by a polycyclopentadiene coating, assuming that one oxygen atom reacts with each double bond present in the molecule, is approximately 24% by weight of the polycyclopentadiene present.

In practice, it has been found that considerably more oxygen than the indicated quantity usually is absorbed by the polycyclopentadiene film upon prolonged exposure to the air, the actual quantity absorbed in a number of cases amounting to 30%, or more, by weight, of the polycyclopentadiene present. It is obvious that a certain quantity of this oxygen is not directly attached to the double bonds initially present in the polycyclopentadiene molecule, or molecules, as the number of such double bonds available is insufficient to provide attachment for more than 24% by weight of oxygen, based on the polycyclopentadiene present.

It is assumed that a certain portion of the oxygen absorbed by the molecule is utilized in the formation of oxygen bridges between adjacent molecules, the point of attachment in either molecule not necessarily being at carbon atoms possessing double bonds. This would account for the absorption of oxygen in quantities greater than that required to saturate the double bonds present in the polycyclopentadiene molecule.

It is further assumed that the formation of such oxygen bridges does not necessarily take place only after the theoretical quantity of oxygen has been absorbed by the double bonds present in the polycyclopentadiene molecule. On the contrary, it is highly probable that the formation of such oxygen bridges proceeds to some extent upon exposure of a freshly prepared polycyclopentadiene film to the air, either at room temperature or at elevated temperatures.

In addition, it is highly probable that a certain proportion of the double bonds present in adjacent molecules in the original polycyclopentadiene film unite with each other by carbon-to-carbon bonds, thus reducing the number of such bonds available for the attachment of oxygen atoms. That this reaction proceeds at a fairly rapid rate, particularly at elevated temperatures, is shown by the fact that polycyclopentadiene films may be converted readily to the insoluble form in the practically complete, or complete, absence of air. This conversion is possible only if we assume that adjacent molecules have united to form a three-dimentional cross-linked system, presumably by the formation of carbon-to-carbon linkages between previously unsaturated carbon atoms.

This phenomena also occurs in polycyclopentadiene solutions in the absence, or substantial absence, of air, as shown by the occasional gelation of such solutions, indicating that at least a portion of the polycyclopentadiene present has united to form a cross-linked, three-dimensional type of structure.

From the foregoing considerations, the following may be said to be a reasonable explanation of the changes which occur in a polycyclopentadiene film upon exposure to air. Oxygen is absorbed by the system, with the formation of oxygen bridges between unsaturated carbon atoms in the same molecule, or in adjacent molecules. At the same time, carbon-to-carbon bridges are being formed between unsaturated carbon atoms in the same or adjacent molecules, the formation of such bridges probably being catalyzed by the presence of oxygen or oxygenated molecules. After a certain amount of such cross linkage has occurred, the oxygenated reaction probably continues at a much more rapid rate than the carbon-to-carbon type of linkage. Due to the fact that the number of available double bonds has been reduced through the formation of carbon-to-carbon linkages, the unsaturated carbon atoms are completely saturated before the theoretical amount of oxygen, namely, 24%, has been absorbed by the polycyclopentadiene. The oxygen absorbed by the polycyclopentadiene beyond this point undoubtedly is utilized in the formation of oxygen bridges between saturated carbon atoms.

The same mechanism is applicable to polycyclopentadiene films which have been converted in an inert atmosphere prior to exposure to air, with the exception that the cross linkage formed during the conversion process in the inert atmosphere employed probably are exclusively of the carbon-to-carbon type.

It is highly probable that the absorption of oxygen during the initial stages of the foregoing process is beneficial in nature. In fact, there is good reason to believe that the absorption of a certain amount of oxygen is necessary in order to completely develop the optimum coating properties of polycyclopentadiene. However, at some stage of the oxygen absorbing process, the further addition of oxygen to polycyclopentadiene results in an increase in color and a reduction in coating properties of the material.

No exact limits can be set to the quantity of oxygen which can be absorbed by polycyclopentadiene beyond the optimum without reducing its adhesive, cohesive, and elastic properties, or increasing its color, due to considerable variations in the molecular weight and structure of different samples of polycyclopentadiene, as well as to variations in the physical method employed for the application of such samples in the form of coating films, such as the nature of the surface to be coated, the thickness of the coating film, the type of solvent employed, the temperature conditions prevailing during different stages of the application, the presence or absence of air during certain stages of the process, and the like. In general, however, it may be said that the absorption of oxygen above the limit of approximately 24% by weight is apt to be accompanied by a reduction in the coating properties of the polycyclopentadiene film.

Even more important than the ability of the secondary amines of the character described to retard the rate of addition of oxygen to the polycyclopentadiene molecule, especially during the later stages in which such oxidation is apt to be undesired, is the ability of these compounds to direct the addition of oxygen in such a way as to greatly retard the appearance of undesirable properties in the coating film. This action is highly unique and singular in character. Thus, in a typical case, a polycyclopentadiene film applied to tin plate in the absence of secondary amines of the character descried was found upon continued exposure to the atmosphere to have absorbed approximately 20% by weight of oxygen during a period of a few weeks. The color of the coating film was increased somewhat and its adhesive, cohesive, and elastic properties were decreased somewhat. A second film prepared from the same sample of polycyclopentadiene, with the addition of a small quantity of a mixture of secondary amines, of the character descried absorbed oxygen at a much slower rate, fifteen weeks being required to secure an oxygen absorption of 20%. Although this is equivalent to the quantity of oxygen absorbed by the previous coating system in the absence of a stabilizing agent, the coating was perfectly colorless and its adhesive, cohesive, and elastic properties were unimpaired.

This improvement is further exemplified by the following experiments.

*Example 3*

A solution of polycyclopentadiene, prepared as shown in Example 2, was applied to the surface of a standard tin-coated steel panel, 2" x 6" in size, after which the coating was baked for a period of 8 minutes at a temperature of 120° C.

Approximately 1% by weight of "Age-Rite Exel," based on the quantity of polymer present was added to a portion of the same polycyclopentadiene solution, after which it was applied to the surface of a tin-coated steel panel and baked as before.

This procedure was repeated, using "Age-Rite Hipar" and "Age-Rite White," respectively, as stabilizing agents.

The coating films were obtained in a weight equivalent to 6 milligrams per square inch in each of the four experiments. These coating films possessed excellent cohesive, adhesive, and elastic properties, and were colorless in nature.

After exposure to air for a period of 2 weeks, the respective coatings possessed the following properties.

| Stabilizing agent used | Ratio of preser wt. of coating film to original wt. of coating film | Adhesion | Cohesion | Elasticity | Color |
|---|---|---|---|---|---|
| None | 1.189 | Excellent | Excellent | Excellent | Very light yellow. |
| Age-Rite Exel | 1.109 | do | do | do | Colorless. |
| Age-Rite Hipar | 1.076 | do | do | do | Do. |
| Age-Rite White | 1.074 | do | do | do | Do. |

After exposure to the air for a total period of 3½ weeks, the respective coatings had the following properties.

| Stabilizing agent used | Ratio of present wt. of coating film to original wt. of coating film | Adhesion | Cohesion | Elasticity | Color |
|---|---|---|---|---|---|
| None | 1.24 | Good | Good | Fair | Yellow. |
| Age-Rite Exel | 1.154 | Excellent | Excellent | Excellent | Colorless. |
| Age-Rite Hipar | 1.161 | ...do | ...do | ...do | Do. |
| Age-Rite White | 1.101 | ...do | ...do | ...do | Do. |

After exposure to the air for a period of six weeks, the respective coatings had the following properties.

| Stabilizing agent used | Ratio of present wt. of coating film to original wt. of coating film | Adhesion | Cohesion | Elasticity | Color |
|---|---|---|---|---|---|
| None | 1.29 | Fair | Fair | Fair | Yellow-brown. |
| Age-Rite Exel | 1.207 | Excellent | Excellent | Excellent | Colorless. |
| Age-Rite Hipar | 1.230 | ...do | ...do | ...do | Do. |
| Age-Rite White | 1.148 | ...do | ...do | ...do | Do. |

It will be noted that the addition of only 1% of the indicated stabilizing agents has completely preserved the original color and coating properties of the polycyclopentadiene films during the indicated storage period. The polycyclopentadiene coating film containing no stabilizing agent was impaired somewhat, both with respect to color and to its coating properties, during the same period. Thus the time between the coating and the time when for example the can is sealed is considerably extended. The atmosphere (including oxygen) is of course excluded as the result of the sealing operation.

The wax-like materials which may be added to solutions of catalytically polymerized cyclopentadiene containing one or more secondary amines of the character described in order to improve the coating properties of such solutions for certain applications are high molecular weight compounds, or mixtures thereof, such as may be found naturally in substances of animal and vegetable origin. Generally speaking, they include esters of higher acids and higher alcohols although substances of mineral origin, for instance substances comprising one or more higher paraffin hydrocarbons, likewise are included in the scope of the term. Likewise, substances of synthetic origin are included, as well as those which occur in nature as animal, vegetable, or other products.

As examples of wax-like materials may be mentioned the following:

Cetyl cerotate, $(C_{16}H_{33}.OOC.C_{26}H_{53})$; cetyl acetate, $(C_{16}H_{33}.OOC.CH_3)$; ethyl palmitate, $$(C_2H_5.OOC.C_{15}H_{31})$$

cetyl palmitate, $(C_{16}H_{33}.OOC.C_{15}H_{31})$; lauryl laurate, $(C_{12}H_{25}.OOC.C_{11}H_{23})$; methyl stearate, $$(CH_3.OOC.C_{17}H_{35})$$

glyceryl stearate, $(C_3H_5(C_{17}H_{35}COO)_3)$; and spermaceti, a naturally occurring wax-like material comprising primarily cetyl palmitate.

Considering the wax-like fatty acid esters just named, it may be said that especially effective additives which may be added to catalytically polymerized cyclopentadiene solutions in conjunction with one or more secondary amines of the character described comprise those in which the chain length of the individual molecules varies broadly from about 18 to 57 carbon atoms and particularly from about 18 to 43 carbon atoms. The esters toward the upper end of the latter range are in general preferred, provided their solubility in the particular solvent containing the polycyclopentadiene is not so low as to render their practicable use less desirable. Mixtures of such esters containing molecules of 28 to 36 carbon atoms are especially satisfactory.

Excellent results are obtained when cetyl palmitate is used as the additive, particularly when in the form of the crude material known as spermaceti, which is obtained from the head of the sperm whale.

One or more wax-like material may be added to the benzene-soluble catalytically polymerized cyclopentadiene solution containing one or more secondary amines of the character described.

The quantity of wax-like additive may preferably be from about 15 to 25% based upon the content of polymer, although more or less may be employed with satisfactory results. Particularly desirable results are obtained in certain cases when approximately 22% of wax-like additive is employed.

It should be emphasized, however, that excellent results are obtained in the absence of the wax-like additive, or of other additives.

As previously pointed out, one or more sulfur containing substances may be employed as an additive to the catalytically polymerized cyclopentadiene solution containing at least one secondary amine of the character described, if desired. The sulfur additive may be used in the presence or absence of the wax-like additive.

Any suitable quantity of sulfur containing material, for example in the form of flowers of sulfur, may be employed of which from 1% to 15% and particularly 10% based upon the polymer content is an example.

Usually, the addition of any sulfur-containing material is made prior to the application of the liquid coating composition to the surface or object to be coated. For example, flowers of sulfur may be added to the polycyclopentadiene solution containing at least one secondary amine of the character described prior to its application to the surface to be coated.

However, sulfur-containing material may be added after the liquid coating composition has been applied to the object to be coated, if desired. This may be accomplished, for example, by drying the coated object in an atmosphere comprising hydrogen sulfide and/or other sulfur-containing material. In this case, the sulfur-containing material is absorbed by the coating composition from the atmosphere.

As previously pointed out, the completely dried films are generally insoluble, particularly in the ordinary solvents.

I have found that by incorporating wax-like material, with or without sulfur-containing material, with benzene-soluble catalytically polymerized cyclopentadiene solutions containing at least one secondary amine of the character described, the properties of the dried resin films are desirably modified, particularly with respect to their ability to withstand drastic metal-working operations, such as the die-drawing steps employed to produce bottle caps or can ends from sheet metal.

It also appears that the addition of wax-like material, with or without sulfur-containing material, to catalytically polymerized cyclopentadiene solutions containing at least one secondary amine of the character described also tends to reduce the rate of oxidation of the polycyclopentadiene film to some extent.

The presence of sulfur containing material appears to improve the solubility of the wax-like material in the solvent in which the benzene-soluble catalytically polymerized cyclopentadiene is dissolved, said solution also containing at least one secondary amine of the character described to form the liquid coating composition, which is an advantage, in addition to other advantages in having sulfur containing material present.

The ratio of additive employed may be varied considerably, depending upon factors such as the particular nature of the additive, the manner of drying, etc.

For example, while I have employed wax-like materials as additives in various concentrations from as low as 1% of the polycyclopentadiene content to as high as 30% and higher with satisfactory results, I find that a concentration of about from 15% to 25%, as for example 22%, is particularly satisfactory, especially when combined with sulfur containing material in concentrations of from about 1% to 15% and particularly of about 10% of the polycyclopentadiene content. The maximum quantity of either material that will ordinarily be used in any given case will, of course, depend somewhat upon the solubility of the particular additive in the polymer solution, although it is conceivable that some of the additive or additives may be present in finely divided dispersed form.

Regardless of the presence or absence of wax-like material and/or sulfur-containing material in the catalytically polymerized cyclopentadiene solution, the quantity of a secondary amine of the character described, or mixture of such amines used need not vary appreciably from that previously set forth, namely, from 0.1% to 10.0%, based on the quantity of polycyclopentadiene present. The wax-like material and/or the sulfur-containing material added to solutions of catalytically polymerized cyclopentadiene containing one or more secondary aryl amines are to be regarded as secondary additives only, and do not replace the secondary amines of the character described used as stabilizing agents in any way.

Examples of sulfur-containing materials suitable for addition to catalytically polymerized cyclopentadiene containing one or more secondary amines of the character described as stabilizing agents are sulfur, hydrogen sulfide, hydrogen polysulfide, $H_2S_x$ (supposed to comprise a mixture of $H_2S_2$ and $H_2S_3$) and sulfur-containing rubber vulcanization agents or accelerators, such as the product known commercially as "Tuads" (tetramethyl thiuram disulfide, $Me_2N.CS.S.S.CS.N.Me_2$) or "Butyl Zimate" ($Bu_2N.CS.S.Zn.S.CS.N.Bu_2$) either separately or in suitable admixture with each other. Thus, for example, 12% hydrogen polysulfide; 0.1% to 5.0% "Tuads"; and 0.1% to 3.0% "Butyl Zimate"; either alone or with varying amounts of sulfur, such as from 1.0% to 3.0% sulfur, are among the additive combinations which have been employed in conjunction with secondary amines of the character described, either with or without the addition of suitable wax-like materials, to give resin films on sheet metal capable of withstanding drastic shaping and forming operations.

One method of measuring the improvement in the coating properties of polycyclopentadiene solutions containing secondary amines of the character described as stabilizing agent is to apply such coatings to tin plated steel blanks and form caps from such blanks after the expiration of a given storage period. In order to increase the severity of this test, the caps formed in this manner may be of the threaded variety, the threads being rolled into the cap during the cap stamping operation. In addition, the skirt below the threaded section may be bent backwardly upon itself during this operation, the bent section being designated as the "curl."

In evaluating the results of such cap stamping operations, the three portions of the cap which are subjected to the greatest stresses are examined minutely. These include the shoulder, the threaded section, and the curl. For comparison purposes, each section is given a maximum rating of 4. A perfect cap, therefore, receives a rating of 12.

In order to render any imperfections in the coating film more visible, the stamped caps are placed in a dilute copper sulfate solution prior to evaluation. Any crack in the film permits the copper sulfate solution to come in contact with the tin surface and deposit a layer of copper at this point, thus greatly assisting in the location of such imperfections.

The cap forming operation is a very severe one, enormous stresses being placed on certain portions of the coated blank in order to force the metal to flow into the desired form. The permanent distortion of certain portions of the coated blank during this operation is sufficient to result in the elongation of certain areas of the coating film by as much as 50% in order to adequately cover the new surface formed. It may be safely said that this forming operation represents the most severe mechanical stresses which a coating film is called upon to withstand in present commercial operations.

Commercial coating compositions used for this purpose at the present time are far from satisfactory, caps having a rating of 8 or less being commonly produced.

The following examples illustrate the improvement in the coating properties of polycyclopentadiene coating compositions resulting from the use of stabilizing agents of the type disclosed.

Example 4

Sufficient "Age-Rite White" was added to a coating solution of catalytically polymerized cyclopentadiene, sulfur and spermaceti to give a mixture containing 100 parts of polycyclopentadiene, 10 parts of sulfur, 22 parts of spermaceti, and 0.5 part of "Age-Rite White."

This solution was placed on the surface of a tin coated steel panel, after which it was baked for a period of 8 minutes at a temperature of 120° C. A colorless coating film having a weight of 2.0 milligrams per square inch was obtained.

The coated panel was stored in the air for a period of 16½ weeks, after which a threaded cap was stamped from the blank. The coating film on the cap was colorless and possessed excellent cohesive, adhesive, and elastic properties. None of the coating has been removed from the sheet during the stamping operation, and the shoulder and threaded sections were perfect. The cap was given a rating of 11.

Example 5

This was carried out in a manner similar to that described in Example 4, with the exception that 1 part of "Age-Rite Hipar" was substituted for the "Age-Rite White" used in the preceding example.

The coated panel was aged in the air for a period of 16½ weeks, after which a threaded cap was stamped from the panel. The coating was colorless and possessed excellent adhesive, cohesive, and elastic properties. The shoulder and threaded portions of the cap were perfect. The cap was given a rating of 11.

Example 6

This was carried out in the same manner as that described in Example 4, with the exception that 1 part of "Age-Rite Exel" was substituted for "Age-Rite White."

The coated panel was stored in the air for a period of 16½ weeks, after which a threaded cap was stamped from the panel in the usual manner. The coating was colorless and possessed excellent adhesive, cohesive and elastic properties. The coating on the shoulder and threaded sections was in perfect condition. The cap was given a rating of 10.

Example 7

This was carried out in the same manner as Example 4, with the exception that sulfur and spermaceti were omitted from the polycyclopentadiene solution containing the stabilizing agent.

Upon storage in the presence of air for a period of 16½ weeks, and forming a threaded cap from the blank in the usual manner, a cap having a rating of 10 was obtained.

As shown by the foregoing examples, sheet metal coated with polycyclopentadiene containing one or more secondary amines of the character described, particularly secondary aryl amines, as stabilizing agents, either with or without the use of other additives such as wax-like materials or sulfur-containing materials is ready for drastic forming operations, such as encountered in the manufacture of cans or other containers, bottle caps, screw caps, and the like. It will withstand extremely rough treatment without cracking, checking, striating, silking, peeling, loosening, or otherwise injuring the coating.

When made into cans the coating is highly resistant to foods, imparts no taste or odor thereto, and is free from blushing during the sterilization treatment.

An example of the formation of a dual film system in accordance with my invention is as follows:

Example 8

A tin coated steel panel is coated with a 20% solution of polycyclopentadiene in toluene to which 1% of "Age-Rite Hipar," based on the polymer content, has been added. The solution is applied in sufficient quantity to secure a final coating weight of approximately 3 milligrams per square inch after baking.

The coated sheet is placed in an oven and baked at a temperature of 250° F. for a period of 20 minutes, the polycyclopentadiene absorbing oxygen from the atmosphere during the baking process.

Upon cooling, a solution of "Vinylite" in a mixture of higher boiling ketones is applied in sufficient quantity such that the dual film system will have a thickness after drying of the "Vinylite" film equivalent to 4 to 6 milligrams per square inch of dry dual film.

The coated sheet is then rebaked in the same manner as with the primer coat.

Metal sheet thus coated with the dual film may be subjected to forming operations such as those involved in the manufacture of caps, can elements and the like, without injury thereto.

It will be understood, of course, that broadly speaking, the top coat is not limited to "Vinylite," which is the co-polymer of vinyl acetate and vinyl chloride, but may be a polymer of any of the vinyl compounds used as raw materials for the several vinyl resins; e. g., vinyl acetate, vinyl chloride, or vinyl chloracetate. Other types of resins also may be adapted for application as the top coat over my benzene-soluble catalytically polymerized cyclopentadiene coating containing a stabilizing agent of the character described, as well as one or more other additives, if desired.

Vinyl resins suitable for use in forming the top coat of my invention may be formed from vinyl esters by known polymerization processes. The polymerization products of inorganic vinyl esters, such as vinyl halides, or those of organic vinyl esters, such as vinyl esters of aliphatic acids, may be used.

I prefer to use vinyl resins resulting from the co-polymerization of two or more vinyl esters. For example, vinyl resins having desirable properties may be prepared by the co-polymerization of a vinyl halide and a vinyl ester of an aliphatic acid.

Products of the co-polymerization of vinyl chloride and vinyl acetate in proportions ranging from about 10% to 90% by weight of the chloride are particularly desirable.

The commercial product sold under the trade name "Vinylite" falls in the latter category.

The foregoing vinyl resins are substantially water-white and transparent. They are exceptionally resistant to acids, alkalies, and salts in the presence of moisture, and may be used to form flexible top coats which adhere exceptionally well to my primer coat, such top coat (like my primer coat) being odorless and tasteless.

To a certain extent, the characteristics of the preferred vinyl resins are retained when the vinyl resin is modified by the addition of a second resin or gum, a cellulose ester, or a high boiling solvent having plasticizing or softening action on the resin. Due to this property, the vinyl resins may be modified to meet specific requirements without materially altering the chemical properties of the resins employed as the top coat.

However, in the food packaging field, the commercial product sold under the trade name "Vinylite" without modification is well suited for the purpose.

This product is thought to result from the co-polymerization of about 85% of vinyl chloride with 15% vinyl acetate.

Since my films of polycyclopentadiene plus stabilizing agents comprising secondary amines of the character described, with or without additives such as wax-like materials and/or sulfur containing materials, not only bond well to surfaces, but also are highly resistant to attack by foods, and do not impart taste or odor thereto, they may be used as top coats for primer coats of other materials, if desired. It is, of course, understood that my liquid coating composition may be used for both a primer coat and a top coat, or in any other number of coats.

With respect to the temperature and time of baking, I usually prefer to rarely, if ever, exceed about 400° F. and at such temperatures a baking time not longer than about 15 minutes to avoid any possible injury to the film. However while my resin films may be safely subjected to relatively high temperatures for brief periods during baking, in general, I find temperatures up to 350° F. with baking times up to 30 minutes very satisfactory. With higher temperatures the baking time may be correspondingly shortened to yield similarly satisfactory results.

I have found that a particularly satisfactory baking schedule is represented by a temperature of 250° F. for a period of 20 minutes. Another satisfactory baking schedule is represented by a procedure wherein the temperature during the baking process is gradually raised from about room temperature to the maximum desired temperature, such as about 250° F., over a period such as from 15 to 20 minutes. The advantage of a baking schedule such as the latter is that the solvent is driven off more gradually, thus minimizing or eliminating any tendency for the resin film to be ruptured by escaping solvent.

While I refer to "baking" broadly and to "heating in the presence of air" or an "oxygen-containing gas" as a means of drying my coating or film, it is to be understood that the absorption of oxygen by the film need not necessarily take place simultaneously with the heating or baking. On the contrary, I may heat or bake the coating or the coated object in an atmosphere substantially devoid of oxygen, such as an atmosphere of concentrated $H_2S$ and/or in an inert atmosphere as of nitrogen, carbon dioxide, or the like.

Additional drying or hardening of the film may result from the absorption of oxygen after exposure to the atmosphere.

Thus the drying or hardening of a film of polycyclopentadiene containing a stabilizing agent comprising one or more secondary amines of the character described, with or without sulfur containing material and/or wax-like material, may be secured (a) by baking or heating in an oxygen-containing and/or sulfur-containing atmosphere, or (b) baking in an atmosphere devoid of oxygen, followed by exposure to an oxygen-containing atmosphere for a period of time, for example, a week before applying any top coating, such as of "Vinylite," or (c) baking in an atmosphere devoid of oxygen, followed by application of a top coat, and then letting the dual film stand or "season" in contact with an oxygen-containing atmosphere before using the coated article for its intended purpose, (in the last-named case, oxygen evidently penetrates or seeps through the top coat to the primer coat), or (d) applying and drying the primer coat in an atmosphere devoid of oxygen, coating with a top coat of another resin such as "Vinylite," still in an atmosphere devoid of oxygen, and heating the multiple-film system thus formed, still in an atmosphere devoid of oxygen, or (e) any combination of any of the foregoing, or otherwise. It will be understood that an atmosphere devoid of oxygen may have present sulfur-containing material.

In coating sheet metal, for instance, excellent results may be obtained by coating one side, baking that coating and then coating the other side, after which the sheet metal is again baked.

After drying or hardening my modified polycyclopentadiene films are, generally speaking, insoluble.

While the film thicknesses given are found to be extremely suitable for the purpose, and particularly for metal container elements such as food containers and caps, other film thicknesses may obviously be employed without departing from the spirit of the invention.

While in the above specific examples toluene is used, it is to be understood that other suitable solvents may be employed of which benzene, xylene, ethyl benzene, naphtha, chloroform and carbon tetrachloride are examples.

While the foregoing particular description has been concerned primarily with the application of the protective film, or films, to metal sheets of a gauge used in the manufacture of articles such as caps and "tin" cans, it will be obvious that my invention is not limited thereto, but may be applied to any metal sheet material, and, in fact, to metallic objects in general whether prefabricated or not, where a tough strongly adhering film or film system is desired. The fabrication of toys from sheet metal for instance, represents another important field of application for my invention.

Also, the resin film may be applied to metal foil.

As an illustration, tin foil and aluminum foil, each of which is used to package dairy products like butter and cheese, may be so coated. If desired, these materials in molten form may be poured into molds lined with foil coated in accordance with my invention.

So too, lead foil, such as is used to package tea leaves, may be coated in accordance with my invention.

Metal foil may be coated by any desired procedure. For example, the foil may be passed through a solution of the coating material and the excess removed by means of doctor blades or rolls. Or a conventional roll type coating procedure may be employed and the solvent removed and/or recovered in any suitable manner. Or the coating material may be poured or sprayed on the material to be coated and the excess removed by doctor blades or rolls, or simply allowed to drain away.

If desired, metal foil may be strengthened by backing it with paper, or by laminating two or more foil layers. For example, a sheet of metal foil may be coated on one side and the coated side pressed into contact with a sheet of paper or second sheet of foil before the coating material has completely dried. This may be followed by coating the opposite side of the metal foil and drying the film for contact with foodstuffs. On the other hand, metal foil coated with my dual film system with "Vinylite" as the top coat may be hot pressed against paper or foil to effect union of the materials.

While the invention has been more particularly described in connection with the coating of sheet metal including foil in the flat, my resin film or film system may be applied during or after any forming operations for converting the initial material into the finished object. It is generally useful for coating metallic objects in general, whether fabricated from sheet metal or not, or whether pre-fabricated in whole or in part prior to application of the film or film system.

While it is preferred to employ cyclopentadiene as substantially the sole resin-forming hydrocarbon in initially preparing the catalytically polymerized polycyclopentadiene, which is then modified by the addition of stabilizing agents comprising a secondary amine of the character described as well as by the addition of wax-like materials and/or sulfur-containing materials, if desired, the presence or addition of relatively small amounts of still other substances of a resin-forming nature with consequent modified results may be sometimes desirable, provided the outstanding characteristics of the base material are not substantially destroyed. For example, the presence of a homo-polymer of methyl cyclopentadiene or a co-polymer of cyclopentadiene and methyl cyclopentadiene, or both, in amounts up to 10 to 20%, and possibly more, appears to have no deleterious effect.

The presence of up to 20% or more of methyl cyclopentadiene in the starting material from which the polycyclopentadiene resin is prepared appears to have no outstanding deleterious effect.

In addition to wax-like materials and sulfur containing materials other materials, such as pigments, dyes, lakes, gums, rubber, either natural or synthetic, plasticizing agents, and the like may be added to the polycyclopentadiene containing one or more secondary amines of the character described as stabilizing agents, if desired. The same applies with respect to the "Vinylite" or other top coat.

However, in the food packaging field, care should be exercised with respect to any such added substances so as not to lower or destroy the excellent qualities of the original material for this particular use.

Since in the food packaging field the important consideration is that the resin in contact with the food be chemically inert, insoluble in the foodstuff, incapable of imparting odor and taste thereto, and strongly adherent to the enclosing wall, outside portions of the container or foil may be left uncoated, or may be coated with other materials, particularly if suitable, or with my materials with or without modifying agents besides those already mentioned, or otherwise.

While the invention has been described in considerable detail with respect to the use of catalytically polymerized cyclopentadiene containing a stabilizing agent comprising one or more secondary amines of the character described, with or without the use of other additives, as a coating composition, it is to be understood that such compositions also may be used for other purposes for which the peculiar properties of polycyclopentadiene make the composition particularly applicable, such as the use of such compositions for impregnating organic and inorganic fibers, fabrics, and finished articles, for the preparation of adhesives, cements, and joining compositions, and for the preparation of plastic masses in general.

In the claims, the term "resinous polycyclopentadiene" and the term "resinous copolymer of cyclopentadiene and methyl cyclopentadiene" are intended to mean the foregoing polymerized cyclopentadiene and copolymerized cyclopentadiene and methyl cyclopentadiene respectively.

In the specification, the term "cyclopentadiene" is intended to embrace pure and substantially pure cyclopentadiene, as well as cyclopentadiene containing a lesser portion of alkyl cyclopentadienes, such as the methyl cyclopentadienes.

It is to be understood that the above specific examples are by way of illustration. Therefore, changes, omissions, additions, substitutions, and/or modifications may be made within the scope of the claims without departing from the spirit of the invention.

I claim:

1. As a new composition of matter, resinous poly-cyclopentadiene containing a secondary aryl amine.

2. A liquid coating composition comprising benzene-soluble resinous poly-cyclopentadiene in admixture with a stabilizing agent comprising a secondary aryl amine.

3. A liquid coating composition comprising benzene-soluble resinous poly-cyclopentadiene, a secondary aryl amine, and a volatile solvent.

4. A new composition of matter comprising (1) a resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, and (2) a stabilizing agent comprising a secondary amine containing an aryl group.

5. A new composition of matter, comprising (1) resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20% and (2) a stabilizing agent comprising a secondary amine containing more than one aryl group.

6. A new composition of matter comprising (1) a resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, and (2) a stabilizing agent comprising a diaryl amine.

7. A new composition of matter comprising (1) a resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20% and (2) a stabilizing agent comprising a diaryl phenylene diamine.

8. A new composition of matter comprising (1) a resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20% and (2) a stabilizing agent comprising a diaryl-para-phenylene-diamine.

9. A new composition of matter comprising a resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, in admixture with diphenyl-para-phenylene-diamine.

10. A new composition of matter, comprising a resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, in admixture with symmetrical dibeta-naphthyl-para-phenylene-diamine.

11. A new composition of matter, comprising (1) resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, and (2) a stabilizing agent comprising a mixture of diphenyl-para-phenylene-diamine and isopropoxydiphenylamine.

12. A new composition of matter comprising (1) resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, and (2) a stabilizing agent comprising a mixture of diphenyl-para-phenylene-diamine, ispropoxydiphenylamine, and phenyl beta naphthylamine.

13. A new composition of matter comprising (1) resinous polymer of cyclopentadiene selected from the group consisting of resinous polycyclopentadiene and resinous copolymer of cyclopentadiene and methyl cyclopentadiene in which copolymer the proportion of methyl cyclopentadiene does not exceed 20%, and (2) a stabilizing agent comprising a mixture of diphenyl-para-phenylene-diamine and phenyl beta naphthylamine.

14. A new composition of matter comprising resinous polycyclopentadiene and diaryl-para-phenylene diamine.

FRANK J. SODAY.